United States Patent
Mukainakano (10) Patent No.: US 10,611,328 B2
(45) Date of Patent: Apr. 7, 2020

(54) COMPOSITE MATERIAL STRUCTURAL MEMBER AND METHOD OF MANUFACTURING THE COMPOSITE MATERIAL STRUCTURAL MEMBER

(71) Applicant: SUBARU CORPORATION, Tokyo (JP)

(72) Inventor: Yuya Mukainakano, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 78 days.

(21) Appl. No.: 15/813,971

(22) Filed: Nov. 15, 2017

(65) Prior Publication Data

US 2018/0194313 A1 Jul. 12, 2018

(30) Foreign Application Priority Data

Jan. 10, 2017 (JP) ................................ 2017-001825

(51) Int. Cl.
| | |
|---|---|
| *B60R 19/56* | (2006.01) |
| *B29C 70/52* | (2006.01) |
| *B29C 70/02* | (2006.01) |
| *B29C 65/70* | (2006.01) |
| *B29C 39/10* | (2006.01) |

(Continued)

(52) U.S. Cl.
CPC ............ *B60R 19/565* (2013.01); *B29C 39/10* (2013.01); *B29C 65/70* (2013.01); *B29C 70/023* (2013.01); *B29C 70/345* (2013.01); *B29C 70/521* (2013.01); *B29C 70/865* (2013.01); *B60G 7/001* (2013.01); *B29K 2101/10* (2013.01); *B29K 2105/06* (2013.01); *B29L 2031/04* (2013.01)

(58) Field of Classification Search
CPC ... B60R 19/565; B29C 70/865; B29C 70/345; B29C 65/70; B29C 39/10; B29C 70/023; B29C 70/521; B29C 70/06; B29C 70/683; B29C 70/84; B29L 2031/04; B29K 2101/10; B29K 2105/06; B60G 7/001
See application file for complete search history.

(56) References Cited

U.S. PATENT DOCUMENTS

| | | |
|---|---|---|
| 2002/0089149 A1 | 7/2002 | Barbieri et al. |
| 2009/0155524 A1 | 6/2009 | Rapp et al. |

FOREIGN PATENT DOCUMENTS

| | | | |
|---|---|---|---|
| CN | 205035359 A | | 11/2015 |
| JP | 56051325 A | * | 5/1981 |

(Continued)

OTHER PUBLICATIONS

[NPL-1] Kodama et al. (JP 56-051325 A); May 8, 1981 (JPP machine translation to English). (Year: 1981).*

(Continued)

*Primary Examiner* — David Sample
*Assistant Examiner* — Donald M Flores, Jr.
(74) *Attorney, Agent, or Firm* — Troutman Sanders LLP (57) ABSTRACT

A composite material structural member including a core member, composite material members, and at least one composite material sheet. The members are disposed around the core member and are adhered to each other to form a hollow space. The composite material sheet is disposed between the core member and the members so as to overlap the bonded portion between the members. The composite material sheet forms a hollow composited structure together with the members.

12 Claims, 6 Drawing Sheets

(51) Int. Cl.
  *B29C 70/86* (2006.01)
  *B29C 70/34* (2006.01)
  *B60G 7/00* (2006.01)
  B29K 105/06 (2006.01)
  B29K 101/10 (2006.01)
  B29L 31/04 (2006.01)

(56) References Cited

FOREIGN PATENT DOCUMENTS

| | | |
|---|---|---|
| JP | S56-051325 A | 5/1981 |
| JP | S58-089409 A | 5/1983 |
| JP | S63-054216 A | 3/1988 |
| JP | H1-049119 B | 10/1989 |
| JP | H09-099703 A | 4/1997 |
| JP | 2000-108232 A | 4/2000 |
| JP | 3086977 U | 4/2002 |
| JP | 2009-149072 A | 7/2009 |
| WO | 2014/053225 A1 | 4/2014 |

OTHER PUBLICATIONS

JPO work product: Decision of Grant dated Oct. 24, 2018 during the prosecution of Japanese Patent Application 2017-001825; English translation accessble at Dossier.

First Office Action issued in corresponding Chinese Patent Application No. 201711112655.8 dated Feb. 25, 2019.

\* cited by examiner

COMPOSITE MATERIAL STRUCTURAL MEMBER AND METHOD OF MANUFACTURING THE COMPOSITE MATERIAL STRUCTURAL MEMBER

CROSS-REFERENCE TO RELATED APPLICATIONS

The present application claims priority from Japanese Patent Application No. 2017-001825 filed on Jan. 10, 2017, the entire contents of which are hereby incorporated by reference.

TECHNICAL FIELD

The present disclosure relates to a composite material structural member and a method of manufacturing the composite material structural member.

In recent years, a structural member having a three-dimensional shape formed of fiber-reinforced plastic, such as a carbon fiber reinforced plastic (CFRP), is beginning to be used as a structural member constituting a structure including a vehicle body of an automobile. The structural member formed of fiber-reinforced plastic can reduce the weight of the structural member compared with a metal structural member. The structural member formed of fiber-reinforced plastic is manufactured, for example, by heating and compressing, with an autoclave device, a fiber-reinforced plastic laminate laminated with fiber-reinforced plastic sheets in which reinforced fiber is impregnated with a thermosetting matrix resin, and by curing the matrix resin.

For example, Japanese Unexamined Patent Application Publication (JP-A) 2000-108232 discloses a sandwich structure in which edges of a sandwich structure, on which fiber-reinforced plastic (FRP) skin plates including carbon fiber and the like are disposed on both surfaces of a core member, are adhered to each other without using a fastening member. Specifically, in the sandwich structure of JP-A 2000-108232, an FRP coupling layer is provided so as to extend along the surfaces of both edge portions, and a layer including a resin diffused medium is provided between abutted end faces.

In a case of a vehicular structural member that is required to have high strength and high rigidity, it is desirable that the structural member is a closed cross-sectional structure so as to prevent formation of a vulnerable portion. However, the sandwich structure described in JP-A 2000-108232 is a structure in which flat plate-shaped sandwich panels are adhered to each other, and is a structure that is difficult to apply to a component with a complex external shape; accordingly, application to many vehicular structural members is limited.

SUMMARY

Accordingly, it is desirable to provide a composite material structural member that includes a high-strength closed cross-sectional structure that is capable of being applied to a structural member having a complex external shape, and to provide a method of manufacturing the composite material structural member.

An aspect of the present disclosure provides a composite material structural member including a core member, composite material members disposed around the core member and adhered to each other to form a hollow space, and at least one composite material sheet. the sheet is disposed between the core member and the members so as to overlap a bonded portion between the members. The sheet forms a hollow composite material structure together with the members.

Another aspect of the present disclosure provides a method of manufacturing a composite material structural member. The method includes fabricating composite material members capable of being adhered to each other to form a hollow space, fabricating a core member capable of being disposed in a hollow portion formed by the members, laminating a composite material sheet in an area that is on an outer peripheral surface of the core member and that overlaps at least a bonded portion between the members, fabricating a layered structure by laminating the members around the core member on which the composite material sheet is laminated, and by adhering the members to each other, and heating and curing the layered structure.

DETAILED DESCRIPTION

Hereinafter, referring to the accompanying drawings, a preferred example of the present disclosure will be described in detail. Note that in the present specification and in the drawings, components that have practically the same functional configurations are denoted with the same reference numerals and redundant description thereof is omitted. Furthermore, in the present specification and in the drawings, plural components that have practically the same functional configuration may be distinguished from each other by attaching a different alphabetical letter after the same reference numeral. However, in a case in which plural components that have practically the same functional configuration do not need to be distinguished from each other in particular, the same reference numeral alone will be attached.

Exemplary Basic Configuration of Lower Arm

Figure 1:
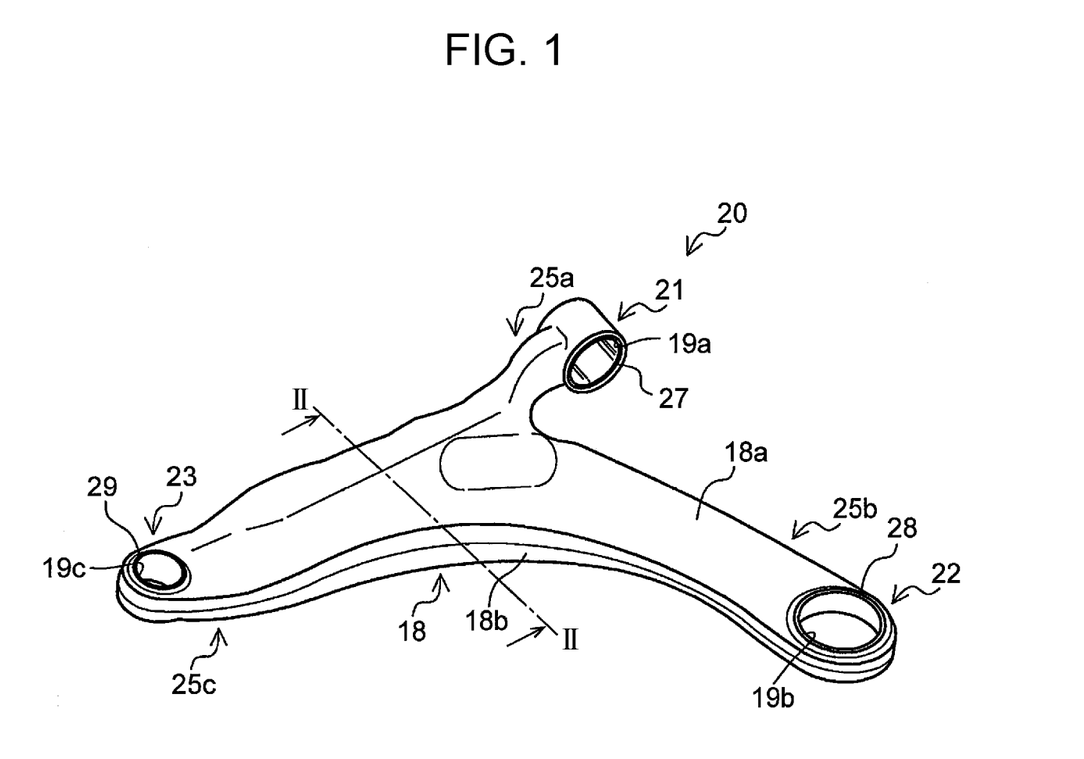
FIG. 1 is a perspective view illustrating an exemplary lower arm of a composite material structural member according to an example.

An exemplary configuration of a lower arm 20 that is one of the modes of the composite material structural member according to the present example will be described. FIG. 1 is a perspective view illustrating an example of the lower arm 20. The lower arm 20 has a planar shape having a substantially T-shape or an L-shape, and includes a first base 21 that is coupled to a suspension cross member of a vehicle body, a second base 22 that is coupled to a side frame of the vehicle body, and a distal end 23, serving as an oscillation end, to which a ball joint is coupled. The above lower arm 20 includes a main body 18, holes 19a, 19b, and 19c provided in the first base 21, the second base 22, and the distal end 23, and cylindrical members 27, 28, and 29 disposed inside the holes 19a, 19b, and 19c. The first base 21, the second base 22, and the distal end 23 are provided on distal end sides of arm portions 25a, 25b, and 25c, respectively.

The main body 18 is a molded body made of a composite material formed by using a fiber-reinforced plastic sheet including continuous fiber, for example. The main body 18 further includes a first half body 18a and a second half body 18b that are adhered to each other. The first half body 18a and the second half body 18b are adhered to each other on a boding surface that extends along a plane that passes through the first base 21, the second base 22, and the distal end 23. The first half body 18a and the second half body 18b are adhered to an outer peripheral surface of a core member (not shown). In other words, the first half body 18a and the second half body 18b are adhered to each other so as to form a hollow space, and the core member (not shown) is provided in the hollow portion. The core member may be, for example, a foamed member or a member having a honeycomb structure.

The first half body 18a and the second half body 18b are formed of a composite material formed of a fiber-reinforced plastic sheet including continuous fiber, for example. The fiber-reinforced plastic sheet including continuous fiber is a sheet that is formed by impregnating a continuous fiber with matrix resin. For example, the first half body 18a and the second half body 18b can each be fabricated by molding a laminate, in which fiber-reinforced plastic sheets are laminated, with a mold. When laminating the fiber-reinforced plastic sheets, the orientations of the continuous fibers may coincide with each other or may be different from each other. In a case in which the orientations of the continuous fibers coincide each other, resistance to tension load in a predetermined direction can be improved. On the other hand, in a case in which the orientations of the continuous fibers are different from each other, resistance to tension load in multiple directions can be improved.

The continuous fiber that is used may include, for example, a carbon fiber; however, a different fiber may be used, or multiple fibers may be used in combination. The different fiber may include, for example, glass fiber, aramid fiber, boron fiber, polyethylene fiber, xyron (registered trademark), or the like; however, the different fiber is not limited to the above examples. However, since carbon fiber has an excellent mechanical characteristic, it is desirable that the reinforced fiber includes carbon fiber.

A thermoplastic resin or a thermosetting resin is used in the matrix resin of the fiber-reinforced plastic. Examples of the thermoplastic resin may include a polyethylene resin, a polypropylene resin, a polyvinylchloride resin, an ABS resin, a polystyrene resin, an AS resin, a polyamide resin, a polyacetal resin, a polycarbonate resin, a thermoplastic polyester resin, a polyphenylene sulfide (PPS) resin, a fluororesin, a polyether imide resin, a polyether ketone resin, and a polyimide resin.

One of the above thermoplastic resins, or a mixture of two or more of the above may be used as the matrix resin. Alternatively, matrix resin may be a copolymer of the above thermoplastic resins. Furthermore, in a case in which the matrix resin is a mixture of the above thermoplastic resins, a compatibilizer may be used in combination. Furthermore, the matrix resin may contain, as a fire proofing agent, a brominated flame retardant, a silicon-based fire proofing agent, a red phosphorus, or the like.

In such a case, the thermoplastic resin that is used may include, for example, a polyolefin-based resin such as polyethylene, or polypropylene, a polyamide-based resin such as nylon 6, or nylon 66, a polyester-based resin such as polyethylene terephthalate, or polybutylene terephthalate, and resin such as polyether ketone, polyether sulfone, or aromatic polyamide. Among the above, the thermoplastic matrix resin is, desirably, at least one selected from the group including polyamide, polyphenylene sulfide, polypropylene, polyetheretherketone, or phenoxy resin.

Furthermore, examples of the thermosetting resin that can be used as the matrix resin may include an epoxy resin, an unsaturated polyester resin, a vinyl ester resin, a phenol resin, a polyurethane resin, and a silicon resin. One of the above thermosetting resins, or a mixture of two or more of the above may be used as the matrix resin. In a case in which at least one of the above thermosetting resins are used as the matrix resin, an appropriate curing agent and an appropriate reaction accelerator may be added to at least one of the thermosetting resins.

A bush (not shown) is press-fitted into each of the cylindrical members 27, 28, and 29. Metal cylindrical members are used as the cylindrical members 27, 28, and 29, for example. The metal that can be used may include, for example, stainless steel, cast iron, titanium, and a titanium alloy; however, the metal is not limited to the above metal. The cylindrical member 27 that is disposed in the tubular first base 21 in the lower arm 20 has a central axis that substantially coincides with a front-rear direction of the vehicle and allows the distal end 23 to oscillate in an up-down direction. Furthermore, the cylindrical member 28 disposed in the second base 22, has a central axis that substantially extends in the vertical direction and allows the distal end 23 to oscillate in a horizontal direction. Note that the metal cylindrical members 27, 28, and 29 are not essential in the composite material structural member according to the present disclosure.

The lower arm 20 configured in the above manner is required to have high rigidity and strength since the load and vibration to the vehicle body is transmitted thereto. Specifically, since a compressive load, a tension load, and a torsion load act in a combined manner to each of the portions of the lower arm 20, the lower arm 20 is required to have resistance to the loads. In a case in which the lower arm 20 is made of a composite material including a fiber-reinforced plastic, the main body 18 is formed by adhering the first half body 18a and the second half body 18b to each other. In such a case, when the first half body 18a and the second half body 18b are adhered to each other with an adhesive agent or the like, the interfaces between the first half body 18a and the second half body 18b, and the adhesive layer tend to be vulnerable. Accordingly, in a case in which the first half body 18a and the second half body 18b are merely adhered to each other with an adhesive agent or the like, there is a concern that a breakage may occur in the adhesive interface when a load acts on the lower arm 20. Conversely, the lower arm 20 according to the present example provides a closed cross-sectional structure that has high strength and high rigidity that suppress brakeage of the bonded interface between the first half body 18a and the second half body 18b forming the main body 18.

1-2. Exemplary Configuration of Structural Member

Figure 2:
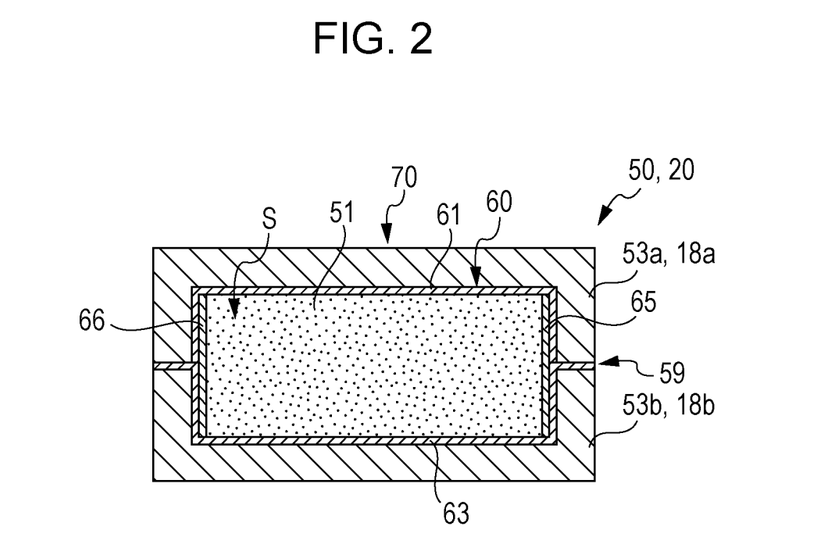
FIG. 2 is a cross-sectional view of the structural member according to the example.

FIG. 2 is a cross-sectional view of a composite material structural member 50 according to the present example, and schematically illustrates a cross section taken along line II-II in the lower arm 20 illustrated in FIG. 1. Note that FIG. 2 is merely an example schematically illustrating a cross section of the structural member 50, and the cross-sectional shape of the structural member 50 may be one of various shapes.

The structural member 50 includes a core member 51, and a composite material structure 70 that is a structure made of a composite material. The composite material structure 70 includes a composite material sheet layer 60 that includes a first member 53a and a second member 53b made of a composite material, and a first sheet 61, a second sheet 63, and third sheets 65 and 66 made of a composite material. In other words, in FIG. 2, the members disposed around the core member 51, as a whole, constitute the composite material structure 70.

The core member 51 is formed of, for example, a foamed member or a member having a honeycomb structure, and serves as a core of the structural member 50. The core member 51 has a shape that substantially corresponds to a hollow portion S formed with the first member 53a and the second member 53b, for example. For example, the core member 51 formed of a foamed member may be formed by filling a foaming resin inside a forming die. Note that the forming method of the core member 51 is not limited to any method in particular. Furthermore, the material constituting the core member 51 is not limited to a resin. By providing a structure including the composite material structure 70 around such a core member 51, the weight of the structural member 50 can be reduced while the strength of the structural member 50 is increased.

The first member 53a and the second member 53b made of a composite material corresponds to the first half body 18a and the second half body 18b of the lower arm 20 illustrated in FIG. 1, for example. The first member 53a and the second member 53b are disposed on the outer peripheral surface of the core member 51, and are adhered to each other directly or with a composite material sheet interposed therebetween to form the hollow space. The hollow portion S is formed by adhering, for example, the edges of the first member 53a and the second member 53b to each other directly or with the composite material sheet interposed therebetween. By configuring the first member 53a and the second member 53b so that the hollow portion S is formed, the amount of the relatively expensive composite material that is used can be reduced and the weight of the structural member 50 can be reduced. The first member 53a and the second member 53b are each formed in a desired shape in advance by molding a laminate of a composite material formed of fiber-reinforced plastic sheets, for example, with a forming die.

The composite material sheet layer 60 formed of the first sheet 61, the second sheet 63, and the third sheets 65 and 66 made of a composite material is disposed between the core member 51, and the first member 53a and the second member 53b so as to overlap a bonded portion 59 between the first member 53a and the second member 53b. In the example of the structural member 50 illustrated in FIG. 2, the first sheet 61 is disposed between the first member 53a and the core member 51, the second sheet 63 is disposed between the second member 53b and the core member 51, and the third sheets 65 and 66 are disposed so as to overlap the bonded portion 59 between the first member 53a and the second member 53b. The composite material sheet layer 60 forms the hollow composite material structure 70 together with the first member 53a and the second member 53b. For example, in the manufacturing stage of the structural member 50, in the course of melting and curing of the matrix resin of the first member 53a and the second member 53b, and the matrix resin of the composite material sheet layer 60, at least a portion thereof may be affixed so as to be formed as a single structure.

The first sheet 61, the second sheet 63, and the third sheets 65 and 66 made of a composite material may use the same sheet as the fiber-reinforced plastic sheet used in forming the first member 53a and the second member 53b, for example. The material constituting the composite material sheet layer 60 may not be the same fiber-reinforced plastic sheet used in forming the first member 53a and the second member 53b; however, by using the same fiber-reinforced plastic sheet, the composite material sheet layer 60, and the first member 53a and the second member 53b melt together such that when cured, the permanent affixation is facilitated and the vulnerability of the interface can be reduced.

By having the third sheets 65 and 66 in the composite material sheet layer 60 be disposed so as to overlap the bonded portion 59 between the first member 53a and the second member 53b, brakeage of the bonded portion 59 of the composite material structure 70 from the inner surface side can be suppressed when a load is applied to the structural member 50. Furthermore, since the composite material sheet layer 60 including the third sheets 65 and 66 that are disposed so as to overlap the bonded portion 59 constitutes the composite material structure 70 permanently affixed to the first member 53a and the second member 53b, brakeage in the interface between the composite material sheet layer 60, and the first member 53a or the second member 53b does no easily happen as well, and the strength and the rigidity of the structural member 50 can be increased.

The composite material sheet layer 60 including the sheets may be disposed across the entire periphery of the core member 51 when viewing a cross section of the structural member 50. By having the composite material sheet layer 60 be disposed across the entire periphery of the core member 51, continuity of the composite material sheet layer 60 can be obtained across the entire periphery, and formation of a vulnerable portion in a portion of the composite material structure 70 can be suppressed. In the above, the sheets of the composite material sheet layer 60 may be disposed across the entire periphery of the core member 51 while overlapping each other. With the above, the composite material sheet layer 60 having a tubular cross section is formed inside the first member 53a and the second member 53b, and the continuity of the composite material sheet layer 60 can be improved. Furthermore, by having the sheets of the composite material sheet layer 60 be disposed across the entire periphery of the core member 51 while overlapping each other, permanent affixation between the composite material sheet layer 60, and the first member 53a and the second member 53b can be obtained more easily in the entire periphery, and the strength and the rigidity of the composite material structure 70 can be improved.

In particular, in the composite material sheet layer 60, the third sheets 65 and 66 that overlap the bonded portion 59 between the first member 53a and the second member 53b may be provided so as to overlap the first sheet 61 and the second sheet 63, respectively. With the above, the continuity of the third sheets 65 and 66, which reinforces the bonded portion 59 between the first member 53a and the second member 53b, with the first sheet 61 and the second sheet 63 is increased, and the strength and the rigidity of the composite material structure 70 can be increased across the entire periphery of the core member 51.

The composite material sheet layer 60 may include a sheet that is disposed from an area between the first member 53a or the second member 53b, and the core member 51 across to the bonded interface between the first member 53a and the second member 53b. In the structural member 50 illustrated in FIG. 2, the second sheet 63 disposed between the second member 53b and the core member 51 is disposed so as to enter the bonded interface between the first member 53a and the second member 53b. Accordingly, the bond strength between the first member 53a and the second member 53b is also increased as well as the increase in the permanent affixation between the composite material sheet layer 60, and the first member 53a and the second member 53b.

The first sheet 61 is disposed between the inner surface of the first member 53a and the outer surface of the core member 51. Furthermore, the second sheet 63 is disposed between the inner surface of the second member 53b and the outer surface of the core member 51 and, further, is disposed so as to extend to the bonded interface between the first member 53a and the second member 53b. Furthermore, the third sheets 65 and 66 are disposed between the first member 53a and the second member 53b, and the core member 51 so as to overlap the bonded portion between the first member 53a and the second member 53b.

Note that an adhesive layer may be provided at an appropriate position or an appropriate area in the interface between the core member 51 and the composite material sheet layer 60, or in the interface between the composite material sheet layer 60, and the first member 53a or the second member 53b.

The lower arm 20 serving as the composite material structural member 50 according to the present example is a structural member that has a three-dimensional structure having a substantially T-shape or a substantially L-shape, and the cross section that is cut along any position and that is orthogonal to the bonding surface between the first half body 18a and the second half body 18b may have a configuration exemplified in FIG. 2. With the above, the strength and the rigidity of each portion of the lower arm 20 can be increased and the resistance to various loads that are input can be improved.

2. Method of Manufacturing Composite Material Structural Member

Referring next to FIGS. 3 to 7, an exemplary method of manufacturing the composite material structural member 50 according the present example will be described. Herein, a case in which a thermosetting resin is used as the matrix resin of the fiber-reinforced plastic sheet serving as a molding material of the first member 53a, the second member 53b, and the composite material sheet layer 60 will be described as an example.

Figure 3:
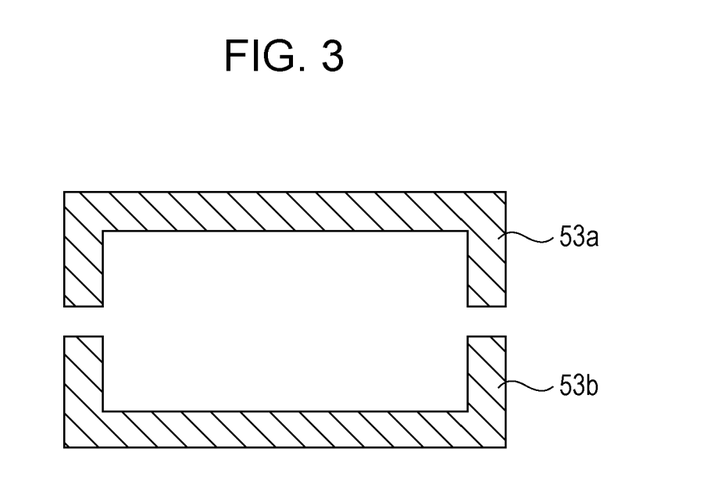
FIG. 3 is an explanatory drawing illustrating a method of manufacturing the structural member according to the example.

As illustrated in FIG. 3, first, the first member 53a and the second member 53b made of a composite material is fabricated. The first member 53a and the second member 53b can be fabricated in the following manner. Note that the method of fabricating the first member 53a and the second member 53b described below is merely an example and does not limit the present disclosure.

A fiber-reinforced plastic sheet (a prepreg) of a predetermined width is first cut into a size or a length that is suitable for the fiber-reinforced plastic structure that is to be manufactured. The shape of the prepreg may substantially coincide with the shape of the developed first member 53a or second member 53b. In such a case, the size of the prepreg may be larger than the external shape of the first member 53a or the second member 53b. The fiber-reinforced plastic sheet including continuous fiber is manufactured with, for example, a known film impregnation method, a known melt infiltration method, or the like in which reinforced fiber is impregnated with matrix resin while the reinforced fiber is continuously sent out. The above fiber-reinforced plastic sheet is cut as appropriate and a prepreg having a desired planar shape is fabricated. A thickness of a single fiber-reinforced plastic sheet or prepreg may be within the range of 0.03 to 1.0 mm, for example.

Subsequently, prepregs in a half-melted state are laminated and a fiber-reinforced plastic laminate is fabricated. The prepregs are, for example, laminated on a die surface of the forming die. The number of prepregs that are laminated is not limited in particular, and can be selected in accordance with the purpose and the like of the fiber-reinforced plastic structure that is to be manufactured; however, three to six prepregs can be laminated. In so doing, the fiber-reinforced plastic laminate may be fabricated by laminating the prepregs while the orientations of the continuous fibers of the prepregs are arranged in one direction. With the above, the strength of the structural member 50, which is to be manufactured, in a specific direction extending in the orientation of the continuous fibers can be increased. Alternatively, the fiber-reinforced plastic laminate may be fabricated by laminating the prepregs while the orientations of the continuous fibers of some or all of the prepregs are different. With the above, anisotropy can be provided in the strength of the structural member 50 that is to be manufactured.

Note that in a case in which prepregs are laminated to form the fiber-reinforced plastic laminate, the types and the content percentages of the reinforced fibers included in the fiber-reinforced plastic sheets may be different. Furthermore, in the fiber-reinforced plastic sheets that are to be laminated, the matrix resins may use different materials having compatibility, or different additives or the like may be mixed to the same matrix resin. In such a case as well, in order to efficiently melt and cure the fiber-reinforced plastic laminate, it is desirable that matrix resins having melting points approximate to each other are used.

Subsequently, a rubber bag (a coating sheet), for example, is installed over the fiber-reinforced plastic laminate disposed on the forming die, and the bag and the forming die are clamped to each other. The forming die, for example, may be a mold or may be a fiber-reinforced plastic forming die. The bag may be any bag that is formed of a material that can be deformed and is not limited to the rubber bag. However, the forming die and the bag are both configured of materials that can resist the heat treatment using an autoclave device in the following step. With such bagging, at least the molding space formed by the forming die and the bag is in an air-tight state.

Subsequently, the bagged fiber-reinforced plastic laminate is cast inside the autoclave device. The autoclave device is a device that performs a heat treatment while bringing the inside of the oven into a high-pressure state. After the fiber-reinforced plastic laminate is cast inside the autoclave device, the air inside the molding space is suctioned with a pump or the like, and the molding space is brought to a vacuum state. With the above, while the prepreg and the fiber-reinforced plastic laminate are deaired, the fiber-reinforced plastic laminate is heated under compression, and is cured. With the above, the first member 53a or the second member 53b is each formed. By heating under compression while the molding space is brought to a vacuum state, the void content of the first member 53a that is formed can be reduced and the mechanical strength of the first member 53a can be increased. Furthermore, since the molding space is brought to a vacuum state, the surface on the opposite side with respect to the surface in contact with the forming die has a relatively clean finish.

Figure 4:
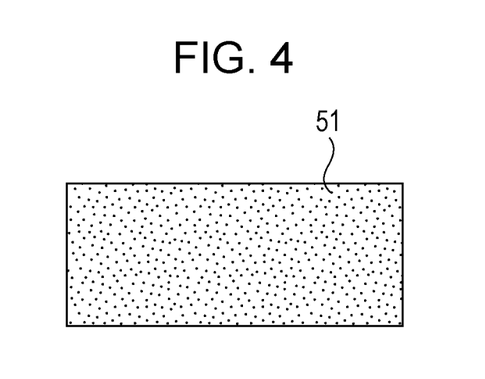
FIG. 4 is an explanatory drawing illustrating the method of manufacturing the structural member according to the example.

Subsequently, as illustrated in FIG. 4, the core member 51 that can be filled inside the hollow portion formed when the first member 53a and the second member 53b are adhered to each other is fabricated. For example, in a case in which a core member 51 formed of a foamed member is fabricated, a forming resin is filled inside a forming die that forms a molding space that corresponds to the external shape of the core member 51, and by curing the forming resin, the core member 51 formed of the foamed member is fabricated. Note that the fabrication method of the core member 51 is not limited to any method in particular. Furthermore, the material and the form of the core member 51 are not limited to any material and form in particular. Furthermore, it does not matter which of the step of fabricating the first member 53a and the second member 53b, or the step of the fabricating the core member 51 is performed first.

Figure 5:
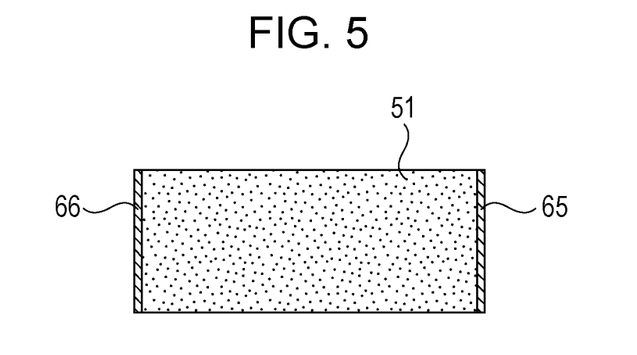
FIG. 5 is an explanatory drawing illustrating the method of manufacturing the structural member according to the example.

Subsequently, the sheet made of the composite material is laminated on an area that is the outer peripheral surface of the core member 51 and that overlaps at least the bonded portion 59 between the first member 53a and the second member 53b. As illustrated in FIG. 5, in the exemplary example, since the bonded portion between the first member 53a and the second member 53b is positioned on both left and right lateral surfaces of the illustrated core member 51, the sheet (the third sheets) 65 and 66 made of the composite material are laminated on both left and right lateral surfaces of the core member 51. The third sheets 65 and 66 may be disposed on the core member 51 while in a half-melted state. Furthermore, the third sheets 65 and 66 may be disposed on the core member 51 using an adhesive agent.

Figure 6:
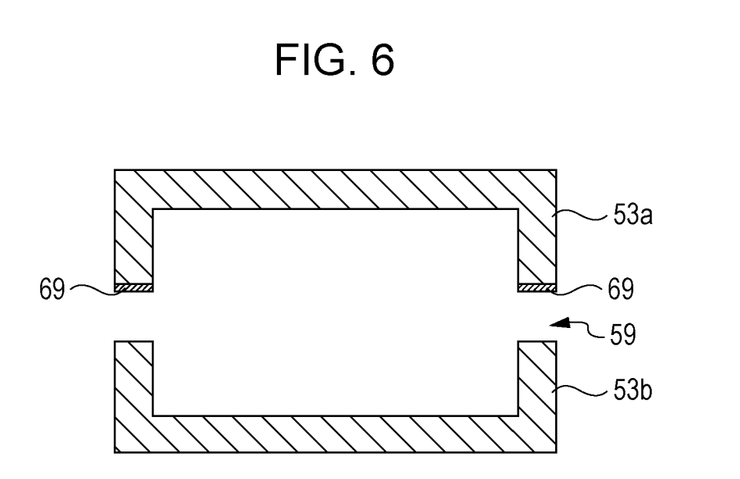
FIG. 6 is an explanatory drawing illustrating the method of manufacturing the structural member according to the example.

Subsequently, as illustrated in FIG. 6, an adhesive agent 69 is applied to at least one of the bonding surfaces of the first member 53a or the second member 53b that are to be adhered. The adhesive agent 69 may be a liquid or gelatinous adhesive agent, or may be a sheet-shaped adhesive material. Furthermore, the adhesive agent 69 may be a thermosetting adhesive agent 69 so that the adhesive agent 69 is cured in the heating step. While such a step of applying the adhesive agent 69 can be omitted, application of the adhesive agent 69 allows the first member 53a and the second sheet 63 to be fixed before thermosetting the first member 53a and the second member 53b, and the composite material sheet layer 60.

Figure 7:
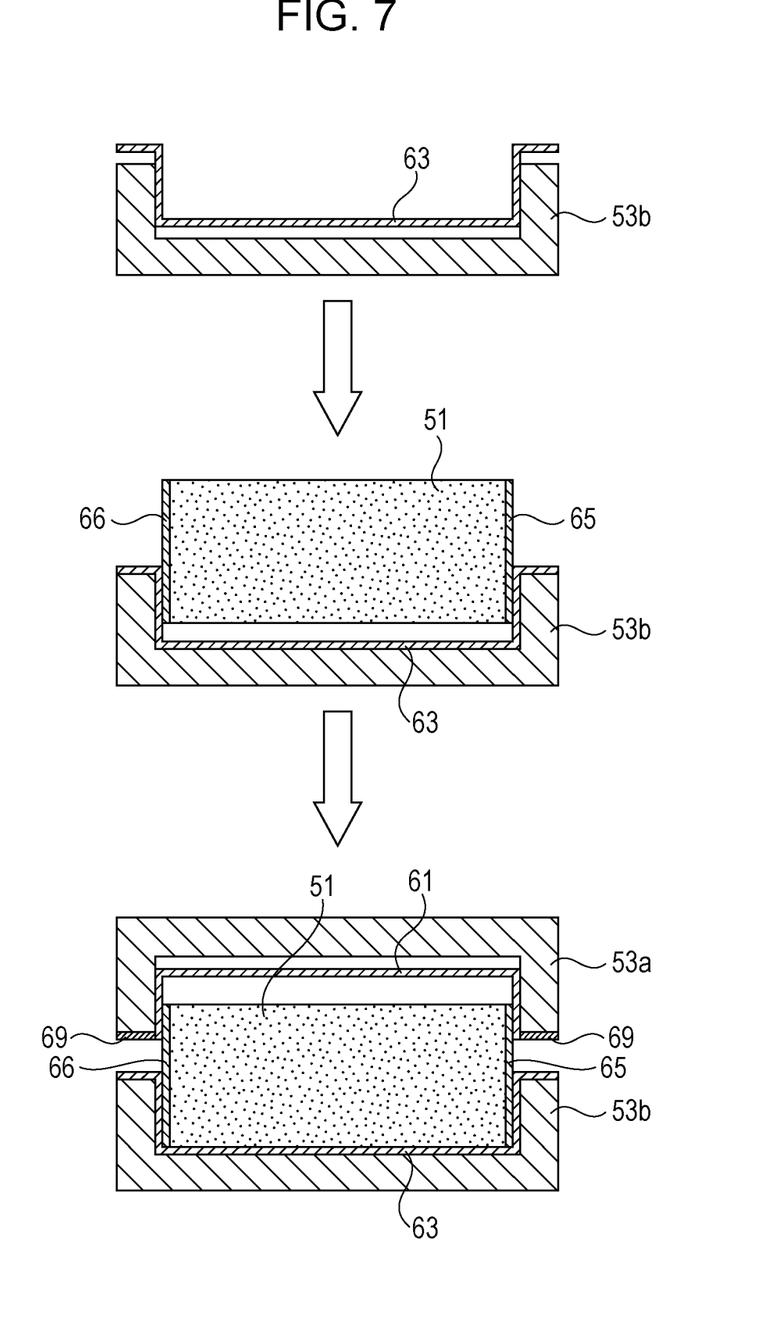
FIG. 7 is an explanatory drawing illustrating the method of manufacturing the structural member according to the example.

Subsequently, as illustrated in FIG. 7, the second member 53b, the second sheet 63, the core member 51, the first sheet 61, and the first member 53a are laminated to each other. In the example illustrated in FIG. 7, after the second sheet 63 that is made of the composite material and that is in a half-melted state is laminated on the second member 53b fabricated in the previous step, the core member 51 on which the third sheets 65 and 66 have been laminated on both sides thereof is laminated. Furthermore, after the first sheet 61 in a half-melted state is laminated on the core member 51, the first member 53a is laminated. The first sheet 61 may be laminated together with the first member 53a after being laminated to the inner surface of the first member 53a in advance. In so doing, an adhesive agent may be applied to an appropriate position and area.

Figure 8:
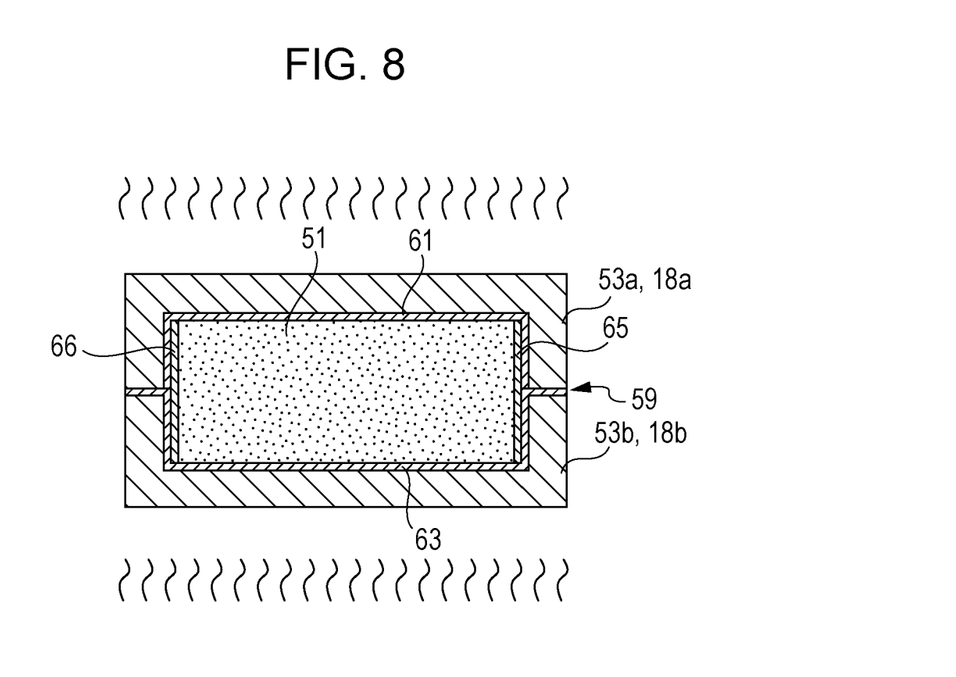
FIG. 8 is an explanatory drawing illustrating the method of manufacturing the structural member according to the example.

Subsequently, as illustrated in FIG. 8, the laminated structure is heated and the thermosetting resin that is the matrix resin made of the composite material is cured to fabricate the structural member 50. In the fabricated structural member 50, the composite material sheet layer 60 becomes, while becoming permanently affixed to the core member 51 across the entire periphery thereof, permanently affixed to the first member 53a and the second member 53b as well, and a hollow composite material structure 70, inside of which the core member 51 is disposed, is formed.

In the structural member 50 manufactured in the above manner, the third sheets 65 and 66 made of the composite material are disposed so as to overlap the bonded portion 59 between the first member 53a and the second member 53b. The composite material structure 70 may be formed so as to have a high-strength closed cross-sectional structure such that when a load is applied to the structural member 50, brakeage of the bonded portion 59 between the first member 53a and the second member 53b from the inner surface side can be suppressed. With the above, even in a structural member 50 having a relatively complex external shape, the strength and the rigidity of the structural member 50 can be improved.

Note that in a case in which a thermoplastic resin is used as the matrix resin of the fiber-reinforced plastic, it is only sufficient to laminate the first member 53a, the second member 53b, the first sheet 61, the second sheet 63, and the third sheets 65 and 66 to each other that have been formed into predetermined shapes beforehand, and to cool and cure the above after the heating and melting. With the above, the structural member 50 including a composite material structure 70 in which the composite material sheet layer 60, which includes the third sheets 65 and 66 that are disposed so as to overlap the bonded portion 59 between the first member 53a and the second member 53b, and the first member 53a and the second member 53b are permanently affixed to each other is manufactured. Accordingly, the structural member 50 in which the strength and the rigidity thereof have been improved can be obtained.

The composite material structural member 50 according to the exemplary example has been described thus far; however, the structural member 50 is not limited to the example described above. Hereinafter, a few modifications of the composite material structural member 50 according to the present example will be described.

Figure 9:
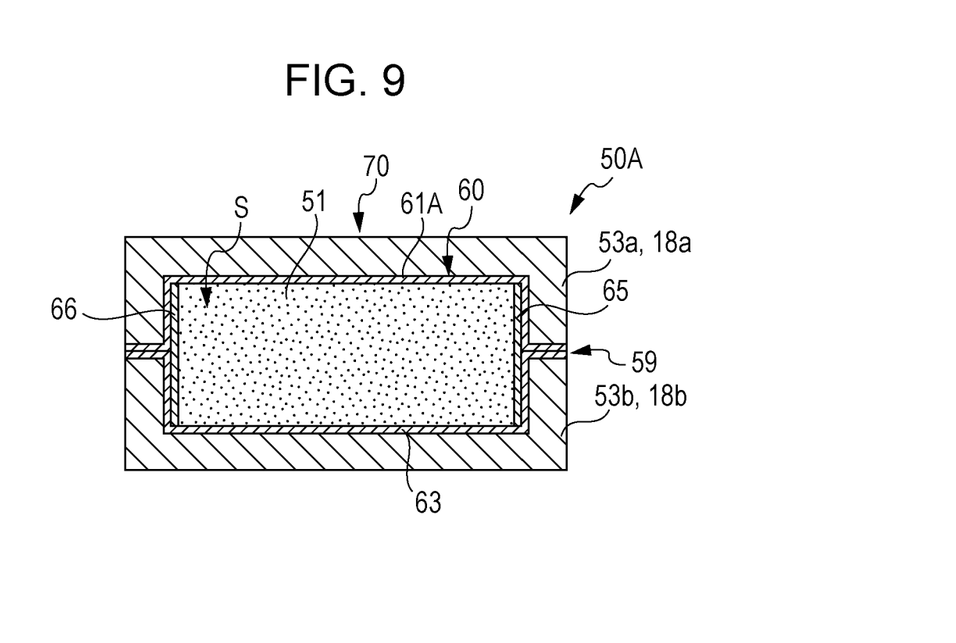
FIG. 9 is a cross-sectional view of a structural member according to a modification of the example.

FIG. 9 is a schematic diagram illustrating a cross section of a structural member 50A according to a first modification. The structural member 50A according to the first modification is an example in which, not only the second sheet 63 made of the composite material, the edges of the first sheet 61A are also disposed across the bonded interface between the first member 53a and the second member 53b. Other than the above configuration, the configurations are similar to the configurations of the structural member 50 according to the example described above. The structural member 50A according to the first modification can be manufactured, for example, by laminating the second sheet 63 on the second member 53b, by laminating the first sheet 61A on the first member 53a, by laminating the first member 53a and the second member 53b to each other so as to interpose the core member 51 therebetween after the third sheets 65 and 66 are laminated on both lateral surfaces of the core member 51, and by thermosetting the above.

With the structural member 50A according to the first modification as well, the composite material structure 70 having a closed cross-sectional structure in which the composite material sheet layer 60, the composite material sheet layer 60 being disposed across the entire periphery of the core member 51 and including the third sheets 65 and 66 that are disposed so as to overlap the bonded portion 59 between the first member 53a and the second member 53b, and the first member 53a and the second member 53b are permanently affixed to each other is formed. With the above, brakeage of the bonded portion 59 between the first member 53a and the second member 53b from the inner surface side can be suppressed from happening when a load is applied to the structural member 50A. Accordingly, even in the structural member 50A that has a relatively complex external shape, the strength and the rigidity of the structural member 50A can be improved.

Figure 10:
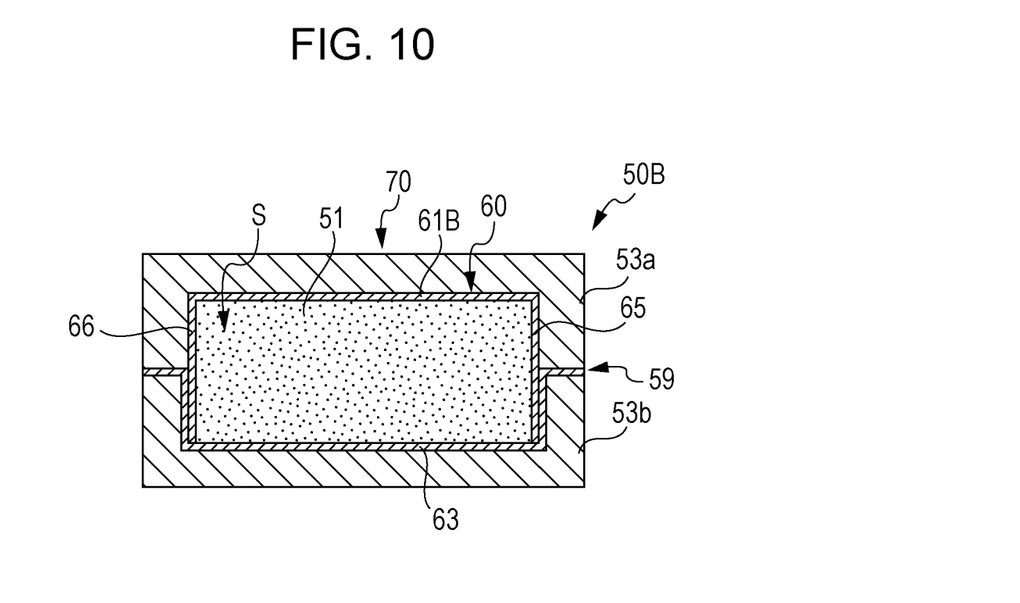
FIG. 10 is a cross-sectional view of a structural member according to a modification of the example.

FIG. 10 is a schematic diagram illustrating a cross section of a structural member 50B according to a second modification. In the structural member 50B according to the second modification, the composite material sheet layer 60 includes two sheets, namely, a first sheet 61B and the second sheet 63. The second sheet 63 in the two sheets is configured in a similar manner to the second sheet 63 of the structural member 50 according to the example described above. In the structural member 50B according to the second modification, the first sheet 61B made of a composite material is disposed from the upper surface and across the two lateral surfaces of the illustrated core member 51 so as to overlap the bonded portion 59 between the first member 53a and the second member 53b. Furthermore, edges of the first sheet 61B are disposed so as to overlap the second sheet 63.

The structural member 50B according to the second modification can be manufactured, for example, by wrapping and laminating the first sheet 61B over the core member 51 from the upper surface and across both lateral surfaces thereof, by laminating the first member 53a and the second member 53b so as to interpose the core member 51 in between after laminating the second sheet 63 on the second member 53b, and by thermosetting the above. In the structural member 50B according to the second modification, since the number of sheets constituting the composite material sheet layer 60 is two, a step of laminating a sheet can be reduced compared to the structural member 50 according to the example described above.

With the structural member 50B according to the second modification as well, the composite material structure 70 having a closed cross-sectional structure in which the composite material sheet layer 60, the composite material sheet layer 60 being disposed across the entire periphery of the core member 51 and including the first sheet 61B that is disposed so as to overlap the bonded portion 59 between the first member 53a and the second member 53b, and the first member 53a and the second member 53b are permanently affixed to each other is formed. With the above, brakeage of the bonded portion 59 between the first member 53a and the second member 53b from the inner surface side can be suppressed from happening when a load is applied to the structural member 50B. Accordingly, even in the structural member 50B that has a relatively complex external shape, the strength and the rigidity of the structural member 50B can be improved.

Figure 11:
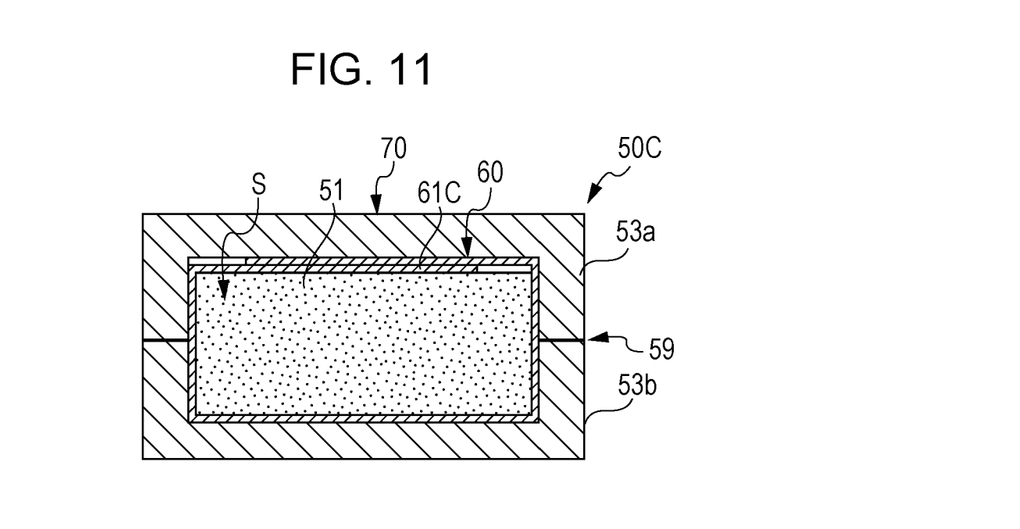
FIG. 11 is a cross-sectional view of a structural member according to a modification of the example.

FIG. 11 is a schematic diagram illustrating a cross section of a structural member 50C according to a third modification. In the structural member 50C according to the third modification, the composite material sheet layer 60 is formed of a single sheet 61C. Such a sheet 61C made of composite material is wrapped and laminated across the entire periphery of the core member 51. Such a sheet 61C is disposed so as to overlap the bonded portion 59 between the first member 53a and the second member 53b. Furthermore, edges of such a sheet 61C are disposed so as to overlap each other. Note that the gaps that have appeared between the first member 53a, and the sheet 61C or the core member 51 are only illustrated for the sake of convenience of illustration, and in actuality, the gaps are filled with a resin and the like.

The structural member 50C according to the third modification can be manufactured, for example, by, after wrapping and laminating the sheet 61C across the entire periphery of the core member 51, laminating the first member 53a and the second member 53b so as to interpose the core member 51 in between, and by thermosetting the above. In the structural member 50C according to the third modification, since the number of sheets constituting the composite material sheet layer 60 is one, two steps of laminating sheets can be reduced compared to the structural member 50 according to the example described above.

With the structural member 50C according to the third modification as well, the composite material structure 70 having a closed cross-sectional structure in which the composite material sheet layer 60, the composite material sheet layer 60 being disposed across the entire periphery of the core member 51 and being formed by the sheet 61C that is disposed so as to overlap the bonded portion 59 between the first member 53a and the second member 53b, and the first member 53a and the second member 53b are permanently affixed to each other is formed. With the above, brakeage of the bonded portion 59 between the first member 53a and the second member 53b from the inner surface side can be suppressed from happening when a load is applied to the structural member 50C. Accordingly, even in the structural member 50C that has a relatively complex external shape, the strength and the rigidity of the structural member 50C can be improved.

As described above, according to the composite material structural member and the method of manufacturing the composite material structural member according to the present example, the composite material sheet layer 60 is formed between the first member 53a and the second member 53b, which are adhered to each other with a hollow space in which the core member 51 is disposed, and the core member 51, in which the composite material sheet layer 60 has a tubular cross section including at least one sheet disposed so as to overlap the bonded portion 59 between the first member 53a and the second member 53b. Such a composite material sheet layer 60 is permanently affixed to at least a portion of the first member 53a and the second member 53b during the manufacturing stage, and constitutes the composite material structure 70. Accordingly, brakeage of the bonded portion 59 between the first member 53a and the second member 53b from the inner surface can be suppressed from happening when a load is applied to the structural member 50. Accordingly, the strength and the rigidity of the structural member 50 can be improved.

Referring to the accompanying drawings, the preferable example of the present disclosure has been described above in detail; however, the present disclosure is not limited to such an example. It is apparent to those ordinarily skilled in the art to which the present disclosure pertains that various modifications or amendments can be perceived within the scope of the technical idea described in the Claims, and it goes without saying that it is understood that the above modifications and amendments are within the technical scope of the present disclosure.

For example, the example described above is configured so as to suppress brakeage from the inner surface of the bonded portion 59 between the first member 53a and the second member 53b from happening; however, a reinforcing sheet that is laminated across the first member 53a and the second member 53b may be provided on an outer surface of the bonded portion 59. With the above, brakeage from the outer surface of the bonded portion 59 can be suppressed as well.

Furthermore, in the example described above, the lower arm 20 has been described as an example of the composite material structural member; however, the structural member to which the present disclosure can be applied is not limited to a lower arm. Other than the structural member of the vehicle body, the present disclosure can be applied to structural members that are used for various purposes.

Furthermore, in the example described above, description has been given using an exemplary structure that adheres the two first member 53a and second member 53b to each other; however, the present disclosure is not limited to the above example. For example, the present disclosure can be applied to a structure in which three or more members are adhered to each other to form a hollow space in which a core member can be disposed. In such a case, a composite material sheet layer that has an overall tubular cross section is formed while a composite material sheet is laminated so as to overlap the bonded portions of each member so that the brakeage from the inner surfaces of the bonded portions of the members is suppressed; accordingly, the strength and the rigidity of the structural member can be improved.

The invention claimed is:

1. A composite material structural member comprising:
    a core member;
    composite material members disposed around the core member and adhered to each other to form a hollow space, wherein each composite material member is disposed only partially around the perimeter of the core member; and
    at least one composite material sheet, the sheet being disposed between the core member and the members so as to overlap a bonded portion between the members, the sheet forming a hollow composite material structure together with the members,
    wherein the at least one composite material sheet comprises a first composite material sheet disposed between a member among the members and the core member, a second composite material sheet disposed between another member among the members and the core member, and a third composite material sheet disposed across the first composite material sheet and the second composite material sheet,
    wherein the third composite material sheet overlaps a bonded portion between the composite material members, and
    wherein the second composite material sheet enters a bonded interface between the composite material members.

2. The composite material structural member according to claim 1,
    wherein the at least one composite material sheet is disposed across an entire periphery of the core member in a predetermined cross section of the structural member.

3. The composite material structural member according to claim 2,
    wherein in the at least one composite material sheet, a composite material sheet that overlaps the bonded portion between the members overlaps another composite material sheet.

4. The composite material structural member according to claim 2, wherein the at least one composite material sheet further comprises a sheet that is disposed from an area between at least one member among the members and the core member, and across a bonded interface between the members.

5. The composite material structural member according to claim 2, wherein the at least one composite material sheet comprises the first composite material sheet disposed between the member among the members and the core member, the second composite material sheet that is disposed between another member among the members and the core member and that is disposed so that the edge thereof overlaps the first composite material sheet.

6. The composite material structural member according to claim 2, wherein the at least one composite material sheet comprises the single composite material sheet that is disposed across an entire periphery of the core member in a predetermined cross section of the structural member.

7. The composite material structural member according to claim 1,
    wherein in the at least one composite material sheet, a composite material sheet that overlaps the bonded portion between the members overlaps another composite material sheet.

8. The composite material structural member according to claim 1, wherein the at least one composite material sheet further comprises a sheet that is disposed from an area between at least one member among the members and the core member, and across a bonded interface between the members.

9. The composite material structural member according to claim 1, wherein the at least one composite material sheet comprises the first composite material sheet disposed between the member among the members and the core member, the second composite material sheet that is disposed between another member among the members and the core member and that is disposed so that the edge thereof overlaps the first composite material sheet.

10. The composite material structural member according to claim 1, wherein the at least one composite material sheet comprises the single composite material sheet that is disposed across an entire periphery of the core member in a predetermined cross section of the structural member.

11. The composite material structural member according to claim 1,
    wherein each composite material member is a half body.

12. A method of manufacturing the composite material structural member of claim 1, the method comprising:
    fabricating the composite material members capable of being adhered to each other to form a hollow space;
    fabricating the core member capable of being disposed in a hollow portion formed by the members;
    laminating the at least one composite material sheet in an area that is on an outer peripheral surface of the core member and that overlaps at least a bonded portion between the members;
    fabricating a layered structure by laminating the composite material members around the core member on which the at least one composite material sheet is laminated, and by adhering the composite material members to each other; and
    heating and curing the layered structure to form the composite material structural member.

* * * * *